United States Patent
Guesnon et al.

(10) Patent No.: US 6,895,806 B2
(45) Date of Patent: May 24, 2005

(54) HOOPED TUBE DIMENSIONING METHOD

(75) Inventors: Jean Guesnon, Chatou (FR); Christian Gaillard, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 350 days.

(21) Appl. No.: 10/202,088

(22) Filed: Jul. 25, 2002

(65) Prior Publication Data

US 2003/0024628 A1 Feb. 6, 2003

(30) Foreign Application Priority Data

Aug. 1, 2001 (FR) .............................................. 01 10362

(51) Int. Cl.$^7$ ............................. G01B 13/10; B31C 1/00
(52) U.S. Cl. ........................ 73/37.9; 73/37.5; 156/143; 428/36.91
(58) Field of Search ................................. 73/37.5, 37.8, 73/37.9; 138/124, 130, 131, 132, 144, 153, 176, DIG. 5, DIG. 7, 172; 156/161, 162, 165, 172, 143; 166/242.2; 428/35.7, 36.3, 377, 408, 902, 36.91

(56) References Cited

U.S. PATENT DOCUMENTS 4,514,245 A    4/1985  Chabrier .................... 156/161
5,110,644 A    5/1992  Sparks et al. .............. 428/36.3
6,146,482 A  * 11/2000  Patton et al. ............... 156/172

FOREIGN PATENT DOCUMENTS

EP         0635667       1/1995    .................. 29/428

* cited by examiner

Primary Examiner—Daniel S. Larkin
(74) Attorney, Agent, or Firm—Antonelli, Terry, Stout & Kraus, LLP

(57) ABSTRACT

A method of dimensioning a hooped tube intended to carry a fluid under pressure. The hooped tube consists of a metal tube and of a reinforcing element wound around the metal tube so as to hoop the tube. In a first stage, the method consists in determining, according to a first series of criteria, the characteristics of the metal tube without the hooping reinforcement that is wound around it at the end of the manufacture process. The first series of criteria includes the resistance to all the mechanical stresses applied to the hooped tube, i.e. compressive, bending, collapse and tensile stresses, with the exception of the radial stresses due to the internal pressure. In a second stage, the method consists in determining the hooping characteristics so as to obtain a determined prestress field in the wall of the hooped tube.

7 Claims, 2 Drawing Sheets

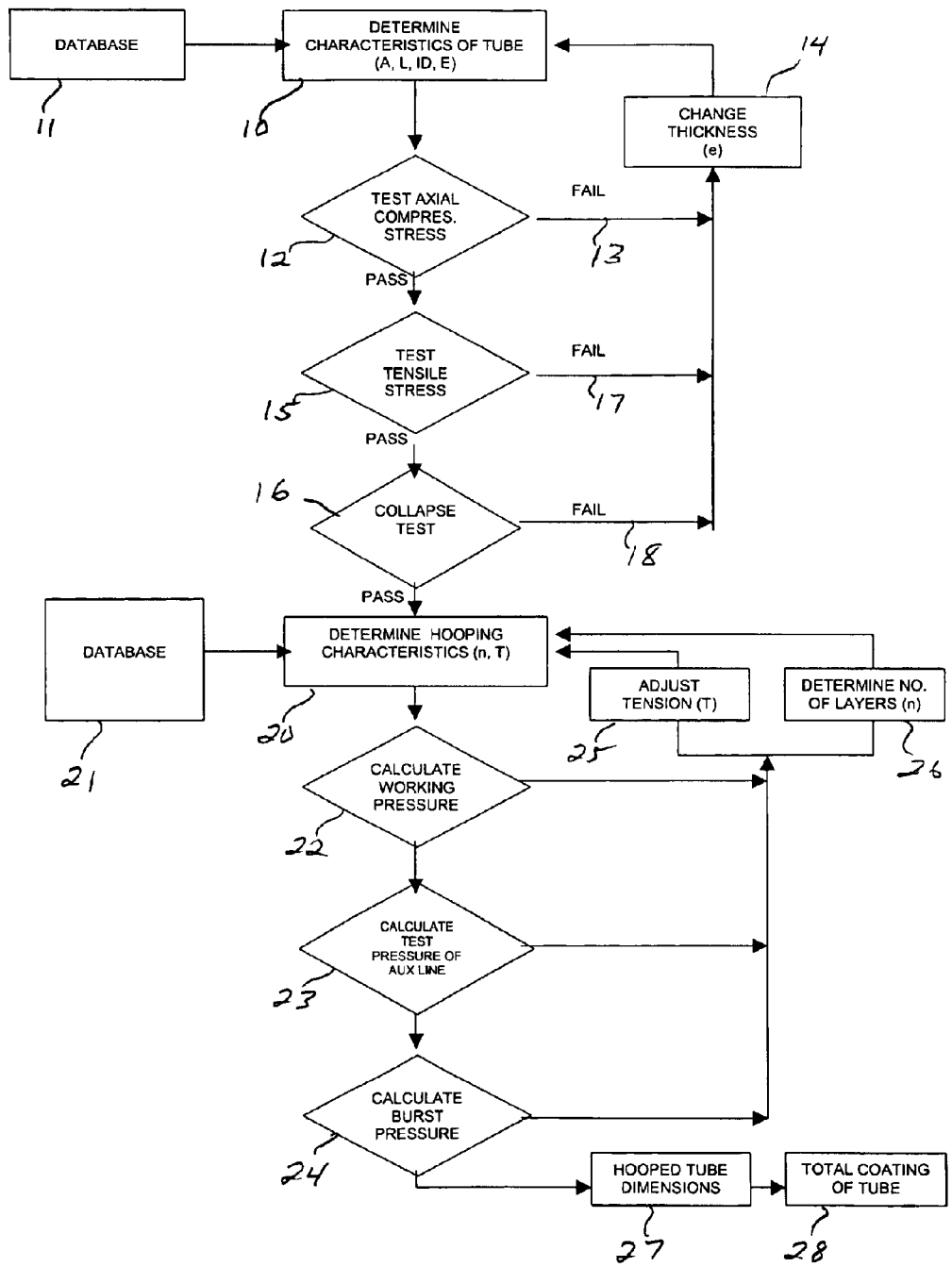

HOOPED TUBE DIMENSIONING METHOD

FIELD OF THE INVENTION

The present invention relates to a method of determining the characteristic dimensioning parameters of a hooped tube.

BACKGROUND OF THE INVENTION

Hooping consists in winding a reinforcing element around a tube, generally made of metal, in order to increase the resistance of the tube to the internal pressure without increasing its weight significantly.

The tube can be a metal tube, for example made of steel. The reinforcing element has a large longitudinal dimension in relation to its cross-section. It can have the shape of a strip, of a wire or of a metal section. The reinforcing element is generally made from fibers, wires or wicks, made of glass, carbon, aramid or steel, coated with a preferably thermoplastic polymer matrix.

The reinforcing element can be wound around the tube while introducing a tension therein. Thus, the element wound around the tube is subjected to tensile stresses. The stresses introduced by the reinforcing element cause the metal tube or core to be stressed. The stresses undergone by the tube are radial in the direction of the axis of the tube.

The hooped tubes manufactured according to the method of the invention are notably used in the oil industry. Oil is produced from an offshore reservoir using a flexible or rigid pipe, generally referred to as riser, which allows the wellhead installed at the sea bottom to be connected to the surface. During well drilling operations, the riser forms the extension, through the water depth, of the casing carrying the oil from the well bottom to the wellhead. The riser is provided with at least two auxiliary lines called kill line and choke line, which are used to establish a hydraulic connection between the support at the sea surface and the wellhead at the sea bottom. More particularly, the auxiliary lines allow fluid to circulate below the closed blowout preventers in case of kick control. Each auxiliary line consists of an assembly of several identical tubes arranged parallel to an element of the riser tube.

In case of kick control, the auxiliary lines contain fluids under high pressure, about 700 bars for example. In order to limit the weight of the riser assembly, the hooped tube technique can be used for the auxiliary lines.

U.S Pat. No. 4,514,254 proposes hooping a tube by winding under tension a metal section around a tube. The tube thus hooped forms a vessel that has to withstand the stresses due to the pressure of the fluid contained in the tube. The tension of the metal section is so selected that, the vessel working under pressure, the stresses in the wall of the tube and the stresses in the metal section layers reach their allowable maximum value at the same time.

SUMMARY OF THE INVENTION

The present invention thus relates to a method of dimensioning a hooped tube intended to carry a fluid under pressure, the hooped tube comprising a metal tube and a reinforcing element wound around said tube, the method comprising the following stages:

determining the material and the dimensions of said metal tube according to the mechanical stresses applied to said tube, with the exception of the radial stresses due to the internal pressure, and determining the tension T applied to the element during winding, and the number of winding layers n in order to obtain a determined prestress field in the wall of the hooped tube.

According to the invention, T and n can be determined so that the prestress field in the hooped tube is such that, at the working pressure, the stresses in said metal tube are less than two thirds of the yield limit of said metal tube and the tension in said element is less than one third of the rupture tensile strength of said element. It is also possible to determine T and n so that the prestress field in the hooped tube is such that, at the testing pressure, the stresses in said metal tube are below the yield limit of said metal tube and the tension in said element is less than half the rupture tensile strength of said element.

Tension T can be adjusted according to the winding diameter of the reinforcing element.

The reinforcing element can be made of carbon fibers coated with a polyamide thermoplastic material.

The method according to the invention can be implemented to manufacture an auxiliary line element of a drilling riser element, and the auxiliary line can be a kill line, a choke line, a booster line or a mud return line.

BRIEF DESCRIPTION OF THE DRAWINGS

Other features and advantages of the present invention will be clear from reading the description hereafter of a non limitative example, with reference to the accompanying drawings wherein:

FIG. 2 illustrates the methodology according to the invention by means ot a flowchart.

DETAILED DESCRIPTION

Figure 1:
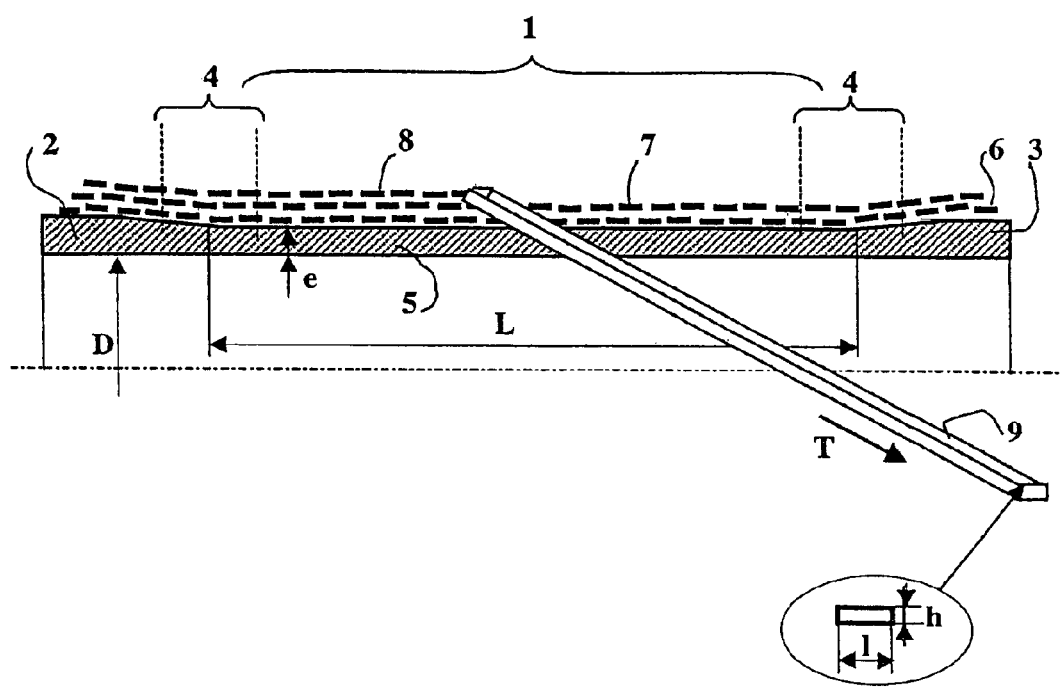
FIG. 1 diagrammatically shows a hooped tube in partial cross-sectional view.

FIG. 1 shows a hooped tube consisting of a metallic tubular core 5 equipped, at both ends thereof, with connections 2 and 3. These connecting elements are suited to allow connection of several lengths of hooped tubes. Main part 1 of the hooped tube consists of a tube of inside diameter ID and of thickness e. Connecting elements 2 and 3 are generally welded onto this main tubular body, which defines, in the vicinity of the weld and in particular on either side thereof, a zone referred to as transition zone 4 shown in FIG. 1.

Hooping consists in winding several layers 6, 7, 8 of a reinforcing element in the form of a strip 9. Winding means (not shown) rotate around the tube and move longitudinally while following the pitch of the strip setting screw, or the tube itself rotates about its axis and the winding means move forward longitudinally. These winding operations are conventional and will not be described here since they are understandable to the man skilled in the art. According to an embodiment, strip 9 consists of carbon fibers coated with a thermoplastic matrix made of polyamide for example. These strips can be prefabricated and brought to the winding means stored on reels. The winding angle is close to 90° in relation to the axis of the tube since the hooping stresses and the working stresses (pressure) are mainly circumferential. The strips are set substantially edge-to-edge so as to form the most continuous possible layer after bonding of the strips. Bonding is preferably carried out by welding of the thermoplastic matrix by heating or ultrasound. A strip coating and bonding material could be used without departing from the scope of the present invention. Hooping is characterized by the tensile strength of the strip and by the tension T applied upon winding.

The number n of hooping layers provided on the hooped tube is also a hooping characteristic. Tension T is generally uniform in a winding layer. On the other hand, the value of tension T can vary from one layer to the next, i.e. tension T can vary according to the winding diameter of the strip on the tube. For example, layer 6 is obtained by winding with a tension T of 2500 N, layer 7 with a tension T of 2480 N, and layer 8 with a tension T of 2470 N. The hooping characteristics depend on the expected stress levels in the tube.

The method according to the invention for determining the manufacture parameters of a hooped tube is illustrated by the flowchart of FIG. 2. The first stage consists in determining the characteristics of the metal tube according to a first series of criteria detailed hereafter. The second stage consists in determining the hooping characteristics according to a second series of criteria also detailed hereafter.

The first stage is intended to determine the characteristics of the metal tube, i.e., with reference to box 10 in FIG. 2, the type of metal A, the length L between the connections, the inside diameter ID of the tube and the thickness e of the tube. Considering the standards (API or others) relative to thick tubes and steel grades, the characteristics of the tube are selected in a database 11.

According to the application of the tube, values can be imposed for A, L, ID or e. For example, in the case of a kill line or of a choke line, the inside diameter ID of the tube is generally standardized. In the case of an auxiliary line of a drilling riser, length L is in direct relation with the length of the riser element. If a characteristic is subjected to no requirement, an initial value is assigned thereto.

The hooped tube undergoes various mechanical loads during use. The forces applied to the hooped tube as it is used are evaluated, measured or calculated. According to the invention, only the metal tube, i.e. the metallic core, without the hooping reinforcement that surrounds it at the end of the manufacture stage, must allow the hooped tube to withstand the compressive, bending, tensile and collapse stresses due to the outside pressure. In a first stage, one checks if the values assigned to characteristics A, L, ID and e allow the metal tube without a hooping layer to withstand the various stresses. This control is carried out by means of several tests. The conventional calculation methods and formulas from the material resistance theory can be used to carry out these tests. Experiments can also be carried out by testing a metal tube.

The first test (diamond 12) consists in checking if the metal tube, such as defined, sufficiently withstands axial compressive stresses, which implies, among other things, that the stiffness of the tube and its buckling strength have to be controlled. The compressive stresses applied to the ends of the hooped tube can cause buckling of the tube. The compressive stresses can be generated by the internal pressure which creates a <<bottom effect>>applied onto the bottoms of the hooped tube. If the stresses generated by the compressive stresses exceed a determined critical value, the value of thickness e is changed as shown by loop 13 and block 14. In case of an industrial impossibility concerning the required thickness, at least one other value of characteristics A, L, ID can be varied. First test 12 is restarted. If the stresses generated by the compressive stresses do not exceed the critical value, second test 15 is carried out. Said critical value is fixed by the user of the method according to the invention. This critical value can be, for example, equal to two thirds of the value for which the compressive stresses cause buckling of the hooped tube core. Simultaneously, one checks if the metal tube withstands the bending stresses. The bending stresses are applied perpendicular to the axis of the tube and lead to a lateral deformation thereof. The bending stresses can be generated by the oceanic currents which bend the auxiliary lines. If the stresses generated by the bending stresses exceed a determined critical value, the same procedure as above is performed, symbolized by loop 13 and block 14. If the stresses generated by the bending stresses do not exceed the critical value, second test 15 is carried out. The critical value is fixed by the user of the method according to the invention. This critical value can be equal to two thirds of the yield limit value of metal A.

The second test consists in checking if the tube withstands the tensile stresses. The tensile stresses are exerted along the axis of the tube and cause lengthening of the hooped tube. The tensile stresses can be due to the weight of the auxiliary line which is applied to a hooped tube, or to the internal pressure applied on the plugs which seal the ends of a tube during testing, or to a lengthening of the riser if the auxiliary line takes part in the mechanical resistance of the pipe. If the stresses generated by the tensile stresses exceed a critical value, the same procedure as described above is performed, as represented by loop 17. If the stresses generated by the tensile stresses do not exceed the critical value, the next test is carried out.

The third test consists in checking if the tube withstands collapse. Collapse of a tube is caused by the stresses exerted in directions substantially perpendicular to the axis of the tube and towards the axis of the tube. These stresses can be generated by the pressure of the fluid applied on the outer surface of the hooped tube. If the stresses generated by the collapse stresses exceed a determined critical value, the same procedure as above is performed as shown by loop 18. If the stresses generated by the collapse stresses do not exceed the critical value, the values obtained for characteristics A, L, ID and e are such that the core of the tube to be hooped withstands the mechanical, compressive, bending, tensile and collapse stresses, i.e. all the possible stresses except the burst stresses. The second stage of the method according to the invention can then be carried out.

The second stage of the method according to the invention is intended to determine the hooping characteristics (block 20). The hooping characteristics include the width 1 and the thickness h of a section of the strip, the type of polymer material P and the type of reinforcing fiber C used for the strips, the number of layers n and the tension T of the metal section as a function of the layer.

Block 21 represents a database relative to the geometry and to the materials available for manufacturing the hooping strip. The iterative calculating mode is performed from the selection, generally imposed by the user, of the type of strip selected in database 21.

According to the invention, hooping is intended to allow the core, once hooped, to withstand the stresses imposed by the internal pressure; the stresses can be calculated according to Von Mises'method. The internal pressure refers to the stresses generated by the fluid under pressure contained in the hooped tube. The dimensioning principle consists in determining tension T and the number of layers n for determined hooping strips that meet constraints imposed by the internal pressure. Block 22 represents the calculation for a working pressure, block 23 for the test pressure of the auxiliary line, block 24 for the burst pressure. The iteration consists, after each test, in adjusting tension T (block 25) and in determining the number of layers n (block 26). The formulas and calculation methods obtained from the material resistance theory can be used to carry out these tests. In fact, the prestress field in the metallic core and in the reinforcing material layer (hooping strips) of thickness e and of given longitudinal tension can be determined by conventional calculation, considering the value of tension T applied to a layer placed on a determined diameter. From the radial stresses applied by the internal pressure, it is possible to calculate the effective stresses in the metallic core and in the hooping strips, considering the existing prestress field. The principle of the invention consists in determining n and T so as to meet specific working, testing and breaking (bursting) criteria. These criteria can be those of the API 16 Q standard: for the working pressure, the stress in the metallic core, calculated according to Von Mises, is less than or equal to two thirds of the yield limit and the hooping tension has to be less than one third of the rupture tensile strength; for the testing pressure, the stress in the metallic core, calculated according to Von Mises, is less than or equal to the yield limit and the hooping tension has to be less than half the rupture tensile strength. Above these pressures, the bursting strength is provided by the reinforcing elements wound around the tube. The working pressure can be imposed by the auxiliary line requirements. The testing pressure can be three halves of the working pressure.

Block 27 shows the obtaining of the hooped tube dimensions and its manufacture characteristics.

Block 28 shows the total coating of the tube, for example by winding a protective layer.

What is claimed is:

1. A method of dimensioning a hooped tube intended to carry a fluid under pressure, the hooped tube comprising a metal tube and a reinforcing element wound around said tube, the method comprising the following stages:

determining the material and the dimensions of said metal tube according to mechanical stresses applied to said tube, with the exception of the radial stresses due to the internal pressure, and determining the tension T applied to the element during winding, and the number of winding layers n in order to obtain a determined prestress field in the wall of the hooped tube.

2. The method as claimed in claim 1, wherein T and n are so determined that a prestress field in the hooped tube is such that, at a working pressure, the stresses in said metal tube are less than two thirds of the yield limit of said metal tube and the tension in said element is less than one third of the rupture tensile strength of said element.

3. The method as claimed in claim 1, wherein T and n are so determined that a field in the hooped tube is such that, at testing pressure, the stresses in said metal tube are less than the yield limit of said metal tube and the tension in said element is less than half the rupture tensile strength of said element.

4. The method as claimed in claim 1, wherein tension T is adjusted according to the winding diameter of the reinforcing element.

5. The method as claimed in claim 1, wherein the reinforcing element is made of carbon fibers coated with a polyamide thermoplastic material.

6. Application of the method as claimed in claim 1 for manufacturing an auxiliary line element of a drilling riser element.

7. Application as claimed in claim 6, wherein said auxiliary line is one of the following lines: kill line, choke line, booster line, and mud return line.

\* \* \* \* \*